Patented Jan. 5, 1954

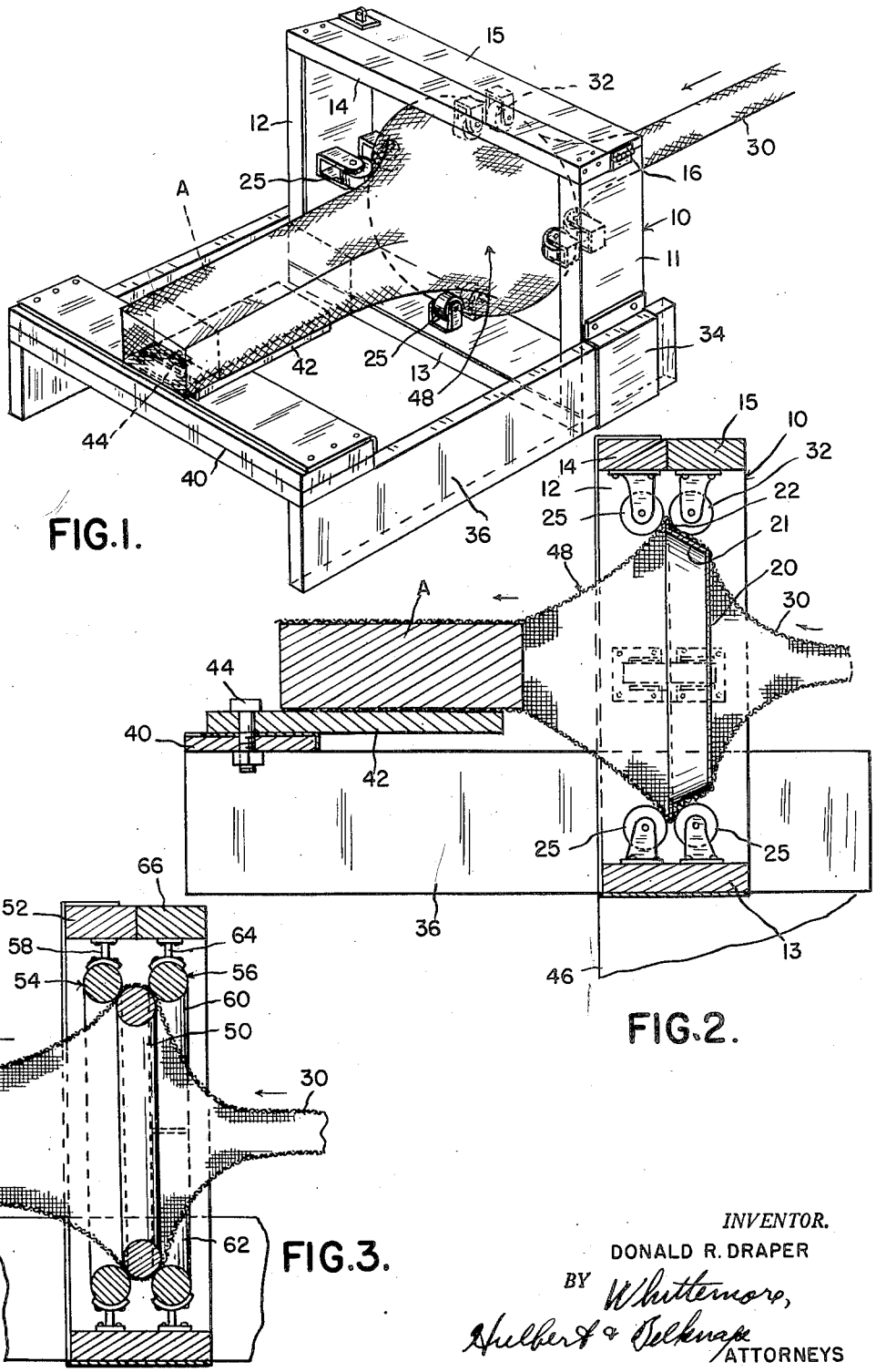

2,665,043

UNITED STATES PATENT OFFICE 2,665,043

APPARATUS FOR APPLYING TUBULAR FABRIC TO ARTICLES

Donald R. Draper, Detroit, Mich.

Application May 31, 1949, Serial No. 96,271

10 Claims. (Cl. 226—18)

The present invention relates to apparatus for applying tubular fabric to articles.

More particularly, the invention relates to the application of a tubular fabric such for example as a stockinet to food products.

It is an object of the present invention to facilitate the application tubular fabric to articles and to provide means which permit rapid application of tubular fabric to a quantity of articles.

It is a further object of the present invention to provide apparatus adapted to greatly facilitate the application of tubular fabric to articles, particularly food articles.

It is a feature of the present invention to provide apparatus including a guide member over which the tubular fabric is advanced so as to retain the end of the tubular fabric in an open condition to receive food articles.

It is a further feature of the present invention to provide apparatus of the character described comprising a guide member for retaining and expanding the end of a tubular fabric in combination with support means for the guide member comprising structure loosely engaging opposite sides of the guide member, so as to permit movement of the tubular fabric around the periphery of the guide member and between the guide member and the supporting structure therefore.

It is a further feature of the present invention to provide apparatus of the character described comprising means for retaining and supporting in open condition the end of a tubular fabric and an article support movable toward and away from the guide member for advancing an article to be covered toward and into operative relationship with the open end of the tubular fabric.

Other objects and features of the invention will become apparent as the description proceeds, especially when taken in conjunction with the accompanying drawings, wherein:

Figure 1 is a perspective view of the apparatus.

Figure 2 is a longitudinal sectional view of the apparatus illustrated in Figure 1.

Figure 3 is a fragmentary longitudinal sectional view of a modified form of apparatus.

Referring now to Figures 1 and 2 the apparatus for applying the tubular fabric to articles comprises a stationary frame 10 comprising a pair of uprights 11 and 12, a lower transverse frame element 13, upwardly fixed transverse frame element 14, and a complementary hinged upper frame element 15, the hinge for the latter being indicated at 16.

The frame 10 as illustrated, is rectangular in cross section and is open at both ends to permit the passage of continuous tubular fabric, such for example as stockinet therethrough.

A guide member is provided within the frame 10 and according to this embodiment of the invention comprises a circular plate 20 having adjacent its periphery an inclined conical portion 21 and which terminates in an outward radially directed flange 22. In the illustrated embodiment the central portion of the guide member 20 is imperforate but if desired the member as a whole may be annular.

In order to support the guide member 20 in the position best illustrated in Figure 2, support structure is provided at opposite sides of the guide member 20. In the illustrated embodiment the support structure comprises angularly spaced pairs of rollers 25 which may be in the form of conventional casters. As shown, four such pairs of rollers are provided spaced at 90 degree intervals but obviously, if desired only three pairs of rollers would be required to provide adequate support for the guide member.

The rollers 25 are positioned so that the plate 20 is relatively loosely mounted therein so as to permit a continuous tubular fabric 30, such for example as stockinet, to be drawn over the guide member 20 and expanded thereby into a condition where an article may be introduced into juxtaposition to the open end of the fabric. The hinged transverse frame element 15 carries one of the rollers as indicated at 32 and when the hinged frame element 15 is raised, it will be readily apparent that the support member 20 may be removed or replaced in the frame.

At the outsides of the vertical frame members 11 and 12 there are provided guides 34 which receive elongated slide elements 36 which are slidable in the guides 34. At their outer ends the guide elements 36 are interconnected by a transverse member 40 to which is secured one end of an article support 42, the connection being afforded by a bolt 44 which permits the article support to be rotated in a horizontal plane about the axis of the bolt 44. The article support 42 has a free end extending toward the support member 20 and it is slidable toward and away therefrom by virtue of the slidable relationship of the members 36 and the guides 34.

In use an article A to be encased in a tubular fabric is placed upon the article support 42 while the article support 42 is in the position illustrated in Figure 1. At this time it is assumed that upon covering of the article previously treated, the tubular fabric was severed at a point spaced slightly from the guide member 20. Preferably, the frame 10 is rigidly supported as for example at the edge of a table or the like indicated at 46 in Figure 2. The operator stands at the front of the apparatus and by pushing against the transverse bar 40 may cause the article A to be moved toward the open end of the tubular fabric and in fact, if desired the article may actually be introduced within the expanded open end of the fabric. At this time the operator will grasp the edges of the tubular fabric with his hands and will draw the same over the article. This results in completely enclosing the article A in the tubular fabric, and the tubular fabric will at this time surround the inwardly extending portion of the article support 42. The operator at this time will transfer his hands to the cross bar 40, at the same time retaining his hold on the end of the tubular fabric, and will draw the slide structure outwardly away from the frame 10 and guide member 20. This will draw the tubular material 30 over the guide member 20 until the parts reach the relative position indicated in Figures 1 and 2. At the same time the operator severs the restricted portion of the fabric as for example at the point indicated at 48. At this time the article will be completely surrounded by the tubular fabric, which due to its resilient nature will closely engage the outer surfaces thereof. In some cases it may be desirable to tie the ends of the fabric about the ends of the article but in many cases this is not necessary. After the foregoing has been completed the article support 42 may be swung about the vertical axis of the bolt 44 to facilitate transfer of the wrapped article away from the apparatus.

Referring now to Figure 3 there is illustrated a modified form of guide member and support structure therefor. In this figure the guide member is indicated at 50 and comprises an annular ring of circular cross section. It is supported within an open rectangular frame 52 by a pair of generally annular support structures 54 and 56. The support structure 54 may if desired comprise a complete annular member or ring which is indicated as supported within the frame 52 by suitable attaching brackets 58. However, to permit removal and replacement of the guide member 50 the support structure 56 preferably comprises a pair of semi-annular elements 60 and 62. The element 60 is attached as by a bracket 64 to a horizontal upper frame member 66 which may be hinged in the same manner as the frame member 15. Thus when the frame element 66 is swung to vertical position the semi-annular support member 60 is moved to clearance position and the annular member 50 may be removed and replaced. Obviously of course, the surfaces of the guide member and support structure which engage the fabric are smooth so that the fabric may be drawn freely against these surfaces. Moreover, in all cases the support member is loosely mounted within the cooperating support structure so that a continuous length of tubular fabric may be drawn thereover.

The present invention has particular utility in the preparation of frozen food products in which it is desirable to provide a reinforcing fabric material surrounding the article prior to subsequent treatment. More specifically, the present invention has to do with a process of handling frozen products in which the product is coated with a material adapted to set and form an impervious coating around the food product, so as to retain its flavor, prevent drying, and so forth. The use of this coating material in combination with a reinforcing fabric of the type disclosed herein is particularly advantageous since the reinforcing fabric to a very considerable extent protects the coating material.

The drawings and the foregoing specification constitute a description of the improved apparatus for applying tubular fabric to articles in such full, clear, concise and exact terms as to enable any person skilled in the art to practice the invention, the scope of which is indicated by the appended claims.

What I claim as my invention is:

1. Apparatus for covering articles with tubular fabric material which comprises a table, an open ended frame on said table, an annular guide member located in said frame with its axis extending through the open ends of said frame, support structure in said frame mounted radially outwardly from said member and loosely engageable with opposite sides of said member, a slide movable on said table toward and away from said frame generally parallel to the axis of said member, an elongated article support secured at one end on said slide and having a free end extending toward said frame.

2. The apparatus as defined in claim 1 in which pivot means is provided for securing said one end of said article support to said slide for pivotal movement in a horizontal plane.

3. Apparatus for covering articles with tubular fabric material which comprises a guide member, and means for supporting the guide member comprising support structures spaced axially of said member at opposite sides of said member loosely supporting said member therebetween, to provide for passage of an elongated tubular fabric over said member, said member comprising a disc having a conical portion adjacent its periphery to stretch the tubular fabric gradually as it is drawn over said member.

4. Apparatus for covering articles with tubular fabric material which comprises an annular guide member, and means for supporting the guide member comprising support structures spaced axially of said member at opposite sides of said member loosely supporting said member therebetween, to provide for passage of an elongated tubular fabric over said member, said member comprising a ring, and said support structure at each side thereof comprising a second ring of slightly larger diameter than said first mentioned ring, the second rings of each support structure being spaced apart a distance less than the thickness of said first mentioned ring.

5. Apparatus for covering articles with tubular fabric material which comprises a table, an annular guide member mounted on said table, means for supporting said guide member comprising support structures spaced axially of said member at opposite sides of said member loosely supporting said member therebetween, to provide for passage of an elongated tubular fabric over said member, and an article support movable on said table toward and away from said member axially thereof.

6. The apparatus defined in claim 5 in which the article support is elongated and has a free end portion extending toward said member and is mounted at the opposite end to provide for drawing the tubular fabric over the article and support simultaneously.

7. Apparatus for covering articles with tubular fabric material comprising a guide member having an annular peripheral portion over which the fabric material may be drawn, and means for supporting said guide member comprising spaced support structures on axially opposite sides of said peripheral portion, said support structures having portions disposed radially inwardly of the outer margin of said peripheral portion in overlying relation to the axially opposite sides of said peripheral portion, the portions of one support structure cooperating with the portions of the other support structure to loosely embrace the axially opposite sides of said peripheral portion and restrict axial movement of said guide member.

8. Apparatus for covering articles with tubular fabric material comprising an annular guide member, and means for supporting said guide member comprising spaced support structure on axially opposite sides of said guide member, said support structures having portions disposed radially inwardly of the outer periphery of said guide member in overlying relation to the axially opposite sides of said guide member, and the portions of one support structure cooperating with the portions of the other support structure to loosely embrace the axially opposite sides of said guide member and restrict axial movement of the latter.

9. Apparatus as defined in claim 8 in which the portions of said support structures comprise rollers arranged in angularly spaced relation around the outer periphery of said guide member, and in which the rollers of one support structure are respectively aligned with the rollers of the other support structure axially of said guide member.

10. Apparatus for covering articles with tubular fabric material comprising a guide member having an annular peripheral portion over which the tubular material may be drawn, and means for supporting said guide member comprising spaced support structures on axially opposite sides of said peripheral portion, said support structures having annularly arranged portions defining registering openings in said support structures and disposed radially inwardly of the outer margin of said peripheral portion in overlying relation to the axially opposite sides of said peripheral portion, the portions of one support structure cooperating with the portions of the other support structure to loosely embrace the axially opposite sides of said peripheral portion and restrict axial movement of said guide member, there being sufficient clearance between the peripheral portion of said guide member and the annularly arranged portions of said support structures for the passage of the tubular material.

DONALD R. DRAPER.

References Cited in the file of this patent

UNITED STATES PATENTS

| Number | Name | Date |
|---|---|---|
| 878,342 | Campbell | Feb. 4, 1908 |
| 945,572 | Murray | Jan. 4, 1910 |
| 1,763,775 | Gottwald | June 17, 1930 |

FOREIGN PATENTS

| Number | Country | Date |
|---|---|---|
| 781,153 | France | Feb. 18, 1935 |